United States Patent [19]
Burkert et al.

[11] 3,754,947
[45] Aug. 28, 1973

[54] LITHIUM ALUMINO SILICATE COMPOSITION HAVING LOW IRON CONTENT

[75] Inventors: George M. Burkert, Morganton; H. Edward Uhland; Ricardo O. Bach, both of Gastonia, all of N.C.

[73] Assignee: First National City Bank, New York, N.Y.

[22] Filed: Aug. 10, 1970

[21] Appl. No.: 62,715

[52] U.S. Cl................ 106/39 R, 423/118, 423/328
[51] Int. Cl.. C04b 33/00, C01b 33/26, C01b 33/32
[58] Field of Search................. 106/39 R, 52; 23/26, 23/110 P, 110 A, 110 R, 203 C, 27; 75/1, 5, 7, 30, 121, 3, 66; 209/11; 423/118, 328

[56] References Cited
UNITED STATES PATENTS

| | | | |
|---|---|---|---|
| 3,394,988 | 7/1968 | Fishwick............................ | 23/110 P |
| 1,789,813 | 1/1931 | Gaus.................................. | 23/203 C |
| 2,811,434 | 10/1957 | Moklebust............................. | 75/30 |
| 2,757,077 | 7/1956 | Lewis et al........................ | 75/121 X |
| 3,236,606 | 2/1966 | Moore et al........................ | 23/110 P |
| 2,776,202 | 1/1957 | Mazza et al............................ | 23/27 |

FOREIGN PATENTS OR APPLICATIONS

| | | | |
|---|---|---|---|
| 1,026,880 | 4/1966 | Great Britain........................... | 75/1 |
| 1,082,250 | 9/1967 | Great Britain......................... | 23/27 |

OTHER PUBLICATIONS
Ceramic Raw Materials, in Cer. Ind. Mag.; Jan. 1967, pp. 90 & 145 "Eucryptite" & "Spodumene".
Waldon, J. C.; Preparation of B–Eucryptite, in At. Eng. Res. Estab. (Gt. Brit.) Memo, 952 (1962) per. Chem. Abst. 57:5531 g.
Jelacie, C.; Compounds Obt'd/Reaction Between Kaolia & Alkali Salts, in Bull. Soc. Franc. Ceram. 64, p. 49–56, (1964) Chem. Abst.: pw 62:15875 d.
Gordienko, V. V.; Chemical Nature of Spodumene, in ZAP. VSES. Minerolog. Obsch. 95, (2) 169–180 (1966) per Chem. Abst.: 65:1970 c.
Latimer, W. M. et al.; Reference Book of Inorganic Chemistry, New York, 1951, pp. 409–411 & 418.

*Primary Examiner*—A. B. Curtis
*Assistant Examiner*—Mark Bell
*Attorney*—Wallenstein, Spangenberg, Hattis and Strampel

[57] ABSTRACT

Lithium alumino silicate compositions having a low iron content, suitable for use in the glass and ceramic industries, are prepared by calcining a mixture of (a) a lithium alumino silicate-containing ore containing a high content of iron, such as spodumene, with (b) predetermined proportions of lithium carbonate or lithium hydroxide. Carbon dioxide is released and driven off where lithium carbonate is employed and water is released and driven off where lithium hydroxide is employed. The finished compositions have low contents of iron with weight ratios of $Li_2O$ to iron (calculated as $Fe_2O_3$) of the order of at least 50.

12 Claims, No Drawings

LITHIUM ALUMINO SILICATE COMPOSITION HAVING LOW IRON CONTENT

Our invention relates to the production of lithium alumino silicate compositions having low contents of iron and which are especially useful in the production of glasses and other ceramics.

The use of lithia-containing products in the glass and ceramic industries has long been known. It has also been known that such lithia-containing products should most desirably be free from iron or their iron contents must be very low since iron contributes objectionable color and other objectionable properties to the finished glasses or other ceramic products.

Spodumene ore would be a suitable and economical lithia-containing product for use in the glass and ceramic industries except that it contains an undesirably high content of iron, which may range from about 0.5% to as high as about 3% calculated as $Fe_2O_3$. Substantial removal of said iron can be effected by subjecting the spodumene to a chloridizing roast but such procedure has not been used extensively because of its high cost as well as for other reasons. It has also been proposed, as shown in U.S. Pat. No. 3,394,988, to reduce the iron in spodumene by heating $\alpha$-spodumene at a temperature in the range of about 1,850° to about 2,100°F to convert it to $\beta$-spodumene and contacting said $\beta$-spodumene, at the aforesaid temperatures, with gaseous chlorine and/or hydrochloric acid. This is stated to sharply reduce the iron content of the spodumene and to produce $\beta$-spodumenes in which the weight ratio of $Li_2O$ to iron calculated as $Fe_2O_3$ is greatly in excess of that in natural spodumene ore, the patent showing ratios in the range of about 30 to in excess of 100.

We have discovered lithium alumino silicate compositions having low contents of iron and high ratios of $Li_2O$ to iron calculated as $Fe_2O_3$ which effectively meet the requirements for low iron lithia-containing products for use in glasses and ceramic products. Such compositions can readily be made to possess weight ratios of $Li_2O$ to $Fe_2O_3$ of 10 to 50 or more.

The compositions of our invention are made by heating a lithium alumino silicate-containing ore having an objectionably high content of iron with a predetermined proportion of lithium carbonate or lithium hydroxide at calcining temperature. The lithium carbonate, or the lithium hydroxide, as the case may be, reacts with the excess acidic oxides present in the lithium alumino silicate-containing ore and carbon dioxide gas is evolved (where lithium carbonate is used), and water is evolved (where lithium hydroxide is used), as is described in further detail below.

The starting lithium alumino silicate-containing ore is most desirably spodumene which in its natural state is $\alpha$-spodumene. Other starting ores which are of the lithium alumino silicate type can, however, be employed in place of or in admixture with spodumene such as eucryptite, petalite and lepidolites. Spodumene in the form of $\beta$-spodumene can also be utilized. The invention will be described below more fully in connection with the use of spodumene ore and the use of lithium carbonate, which represents the particularly advantageous aspect of the invention, but it will be understood that the principles and procedures involved are applicable to the use of other lithium alumino silicate-containing ores having objectionably high contents of iron and the use of lithium hydroxide.

Spodumene ore has the approximate composition of $Li_2O \cdot Al_2O_3 \cdot 4SiO_2$, plus small amounts of impurities in the form of iron oxide and, commonly, sodium oxide and potassium oxide. The $Al_2O_3$ and the $SiO_2$ are "acidic" oxides as distinguished from the $Li_2O$, $Na_2O$ and $K_2O$ which are basic oxides and which form feldspars. Spodumene and other lithium alumino silicate-containing ores contain an appreciable excess of acidic oxides. Depending on a number of matters, the starting spodumene ore may contain from about 1.5% to about 7% by weight of $Li_2O$.

We have found that spodumene can be reacted with lithium carbonate and/or lithium hydroxide by heating it with lithium carbonate and/or lithium hydroxide at calcining temperature the result of which is to release carbon dioxide and/or water, as indicated above, and to form a lithium alumino silicate composition with sharply reduced content of iron and with a substantially increased weight ratio of $Li_2O$ to $Fe_2O_3$ over that of the spodumene ore.

The proportions of lithium carbonate and/or lithium hydroxide which are utilized in relation to the spodumene are variable and are dependent on content of acidic oxides present in the spodumene and the iron content desired in the final composition.

The heating of the reactants, as noted above, is carried out at calcining temperatures which, generally speaking, will usually be in the range of about 600° or somewhat over 600° C, for instance, about 650° C, to somewhat over 900° C, for instance, about 925° C, with between about 700° C and about 800° C representing a generally preferred range. The reaction time is variable and may, depending upon particle size of the reactants and other factors, be as low as about 5 minutes to as high as about 4 hours or more, and will ordinarily be in the range of about ½ hour to 1 ½ hours. The particle sizes of the reactants are variable but it is preferred that said reactants be finely divided, advantageously of a particle size such that the major proportions of said reactants will pass through a 100 mesh screen (U.S. Standard Series).

The $Li_2O$, $Fe_2O_3$, $Na_2O$ and $K_2O$ contents of spodumene ores are, as is well known, variable. Thus, for instance, spodumene ores can be obtained having a content of about 6.5 $Li_2O$ and about 0.7% $Fe_2O_3$ (weight ratio of $Li_2O$ to $Fe_2O_3$ is 9.3) by magnetic separation procedures whereby some iron-containing fractions are removed from the spodumene ore. Other or additional magnetic separations, as mentioned, for instance, in the aforesaid U. S. Pat. No. 3,394,988, can produce starting or untreated spodumene ores in which the $Li_2O$ to $Fe_2O_3$ weight ratios are variable although, usually, such ratios will fall into the range of about 2.5 to about 9.5 of $Li_2O$ to 1 of $Fe_2O_3$, but, depending upon special treatments such as acid washing, the ratio may be as high as about 15 of $Li_2O$ to 1 of $Fe_2 O_3$. Similarly, the content of excess acidic oxides is variable depending upon the particular spodumene ore and such magnetic separation or other treatments to which it is subjected. The same is true as to contents of $Na_2O$ and $K_2O$ in the spodumene ore.

For use in glass or ceramic manufacture, a weight ratio of $Li_2O$ to $Fe_2O_3$ is generally at least about 50. For other uses, reduced contents of iron in the spodumene may be such that the weight ratio of $Li_2O$ to $Fe_2O_3$ may be as low as, say, 10. Another requirement commonly encountered in the glass-ceramic industry is that the lithia-containing products have relatively high weight ratios of $Li_2O$ to $Na_2O$ and to $K_2O$. Thus, by way of illustration, certain specifications, in addition to calling for weight ratios of $Li_2O$ to $Fe_2O_3$ of not less than about 50, also call for weight ratios of $Li_2O$ to $Na_2O$ of at least 13 and of $Li_2O$ to $K_2O$ of at least 20, better still at least about 22. Compositions can readily be made in accordance with our invention to satisfy all of these requirements.

If one starts with a spodumene ore containing, say, 6.5% $Li_2O$ and 0.7% $Fe_2O_3$, in order to obtain a final composition having a weight ratio of $Li_2O$ to $Fe_2O_3$ of 50, 70.5 pounds of lithium carbonate is reacted with 100 pounds of said spodumene ore. Upon calcining said mixture carbon dioxide gas is evolved and 128.5 pounds of finished product are obtained having a $Li_2O$ content of 27.2% and an $Fe_2O_3$ content of 0.545%. In the aforesaid 100 pounds of starting spodumene ore, there are approximately 0.22 lb. moles of $Li_2O$, approximately 0.27 lb. moles of $Al_2O_3$ and approximately 1.06 lb. moles of $SiO_2$. Thus, there is in excess of about 1 lb. mole of acidic oxides available for reaction with the aforesaid added lithium carbonate.

Again, starting with a non-magnetic spodumene ore fraction or concentrate having the following analysis:

| | | |
|---|---|---|
| $Li_2O$ | 3.8% | (.127 mole %) |
| $Al_2O_3$ | 20.0% | (.195 mole %) |
| $SiO_2$ | 72.0% | (1.20 mole %) |
| $Fe_2O_3$ | 0.44% | |
| $Na_2O$ | 1.80% | (.029 mole %) |
| $K_2O$ | 1.32% | (.014 mole %) | it will be noted that there is an excess of about 1.4 mole % of acidic oxides which are available for reaction with lithium carbonate. However, because of considerations of reaction rates, it is convenient to utilize somewhat less than the total amount of lithium carbonate. Thus, for instance, if 1.2 mole % of lithium carbonate is utilized in the reaction with the said non-magnetic spodumen ore, a final composition is obtained having the following analysis:

| | |
|---|---|
| $Li_2O$ | 29.4% |
| $Al_2O_3$ | 14.8% |
| $SiO_2$ | 53.0% |
| $Fe_2O_3$ | .32% |
| $Na_2O$ | 1.33% |
| $K_2O$ | .98% | in which it will be seen that the weight ratio of $Li_2O$ to $Fe_2O_3$ is about 92, the weight ratio of $Li_2O$ to $Na_2O$ is 22.1, and in which the weight ratio of $Li_2O$ to $K_2O$ is 30, which effectively meets specifications such as those set forth above.

The following examples are further illustrative of the practice of our invention, but they are not to be construed as in any way limitative thereof since various changes can readily be made and various other lithium alumino silicate compositions prepared in the light of the guiding principles and teachings disclosed herein. All parts listed are by weight and all temperatures recited are in degrees Centigrade.

EXAMPLE 1

100 parts of non-magnetic spodumene ($\alpha$-spodumene containing 4.18% $Li_2$and 0.51% $Fe_2O_3$) and 53 parts of $Li_2CO_3$ are ball-milled together in a ceramic ball mill to pass through a 100 mesh screen (U.S. Standard). 30.6 parts of said mixture are calcined in a muffle furnace by heating for 1 hour, the reaction beginning at about 660° and being completed at about 780° C, at a heating rate of about 5°/minute. 24.1 parts of a soft sinter is obtained, the finished product being free of $CO_2$ and assaying at 21% $Li_2O$ and 0.42% $FE_2O_3$ the weight ratio of the $Li_2O$ to $Fe_2O_3$ thus being 50.

EXAMPLE 2

100 parts of non-magnetic spodumene ($\alpha$-spodumene, containing 6.53% $Li_2O$ and 0.7% $Fe_2O_3$) and 70 parts of $Li_2CO_3$ are ball-milled together in a ceramic ball mill to pass through a 100 mesh screen (U.S. Standard). 51 parts of said mixture are calcined in a muffle furnace by heating for 3 hours, the reaction beginining at about 660° and being completed at about 920° at a heating rate of about 5°/minute. 38.4 parts of a hard sinter is obtained, the finished product being free of $CO_2$ and assaying at 27.1% $Li_2O$ and 0.54° $Fe_2O_3$, the weight ratio of the $Li_2O$ to $Fe_2O_3$ thus being slightly over 50. In this Example 2 the acidic oxide values are near neutralization which causes a more sluggish reaction than in Example 1, particulary near the end of the heating step.

EXAMPLE 3

100 parts of non-magnetic spodumene ($\alpha$-spodumene, containing 3.8% $Li_2O$, 20% $Al_2O_3$, 72% $SiO_2$, 0.44% $Fe_2O_3$, 1.8% $Na_2O$ and 1.32% $K_2O$) and 45 parts of $Li_2CO_3$ are ball-milled together in a ceramic ball mill to pass through a 100 mesh screen (U.S. Standard). 50 parts of said mixture are calcined in a muffle furnace by heating for 1 hour, the reaction beginning at about 660° and being completed at about 780°, at a heating rate of about 5°/minute. A sinter is obtained, the finished product being free of $CO_2$ and assaying at 29.4% $Li_2O$, 14.8% $Al_2O_3$, 53% $SiO_2$, 0.32 % $Fe_2O_3$, 1.33 % $Na_2O$ and 0.98 % $K_2O$, the weight ratio of the $Li_2O$ to $Fe_2O_3$ thus being about 92, the weight ratio of the $Li_2O$ to $Na_2O$ being 22.1 and the weight ratio of the $Li_2O$ to $K_2O$ being 30.

EXAMPLE 4

100 parts of lepidolite (containing 2.7% $Li_2O$ and 0.26 $Fe_2O_3$, 47% $SiO_2$, 30.6% $Al_2O_3$ and 4.09% F) and 25.5 parts of $Li_2CO_3$ are ball-milled together in a ceramic ball mill to pass through a 100 mesh screen (U.S. Standard). 62.75 parts of said mixture are calcined in a muffle furnace by heating for 1 hour at 750° C. A soft sinter is obtained, the finished product being free of $CO_2$ and assaying at 11.8 % $Li_2O$ and 0.23 % $Fe_2O_3$, the weight ratio of the $Li_2O$ to $Fe_2O_3$ thus being about 51.

EXAMPLE 5

Example 1 is carried out except that, in place of the lithium carbonate, 33 parts of lithium hydroxide are utilized.

What is claimed is:

1. A process for producing a lithium alumino silicate composition having a low content of iron which comprises admixing a lithium alumino silicate-containing ore, selected from the group consisting of spodumene, eucryptite, petalite and lepidolite, having an objectionably high content of iron, with a predetermined proportion of at least one member of the group of lithium carbonate and lithium hydroxide and heating said mixture at a calcining temperature in the range of about 600 to about 925°C. to effect reaction between said lithium carbonate and/or lithium hydroxide and excess acidic oxides present in said starting lithium aluminio silicate-containing ore whereby to produce a lithium alumino silicate composition having a content of $Li_2O$ in the range of about 11.8 to about 29.4% and having a lower iron content than that present in said starting lithium alumino silicate-containing ore.

2. The process of claim 1 in which the calcining temperature is in the range of about 700° to 800° C.

3. The process of claim 2 in which the lithium alumino silicate-containing ore and the lithium carbonate and/or lithium hydroxide have a mesh size the major proportions of which will pass through a 100 mesh screen.

4. The process of claim 2 in which the weight ratio, in the finished lithium alumino silicate composition, of the $Li_2O$ to the $Fe_2O_3$ is at least 50 to 1.

5. The process of claim 2 in which the weight ratio, in the finished lithium alumino silicate composition, of the $Li_2O$ to $Na_2O$ is at least about 13.

6. The process of claim 2 in which the weight ratio, in the finished lithium alumino silicate composition, of the $Li_2O$ to $K_2O$ is at least about 20.

7. The process of claim 2 in which the weight ratio, in the finished lithium alumino silicate composition, of the $Li_2O$ to $Na_2O$ and $K_2O$ is at least about 13 $Li_2O$ to 1 $Na_2O$ and at least about 20 $Li_2O$ to 1 $K_2O$.

8. The process of claim 2 in which the starting lithium alumino silicate-containing ore is a spodumene containing from about 1.5 to about 7% by weight of $Li_2O$.

9. A lithium alumino silicate composition containing from about 11.8 to about 29.4% $Li_2O$ and resulting from reacting, at a calcining temperature in the range of about 600° to about 925° C., a mixture of (a) a lithium alumino silicate-containing ore, selected from the group consisting of spodumene, eucryptite, petalite and lepidolite, having an iron content calculated as $Fe_2O_3$ such that the weight ratio of the $Li_2O$ to $Fe_2O_3$ in said ore is in the range of about 2.5 to 15 of $Li_2O$ to 1 of $Fe_2O_3$, with (b) at least one member of the group of lithium carbonate and lithium hydroxide in a proportion such as to react with at least most of the acidic oxides present in said (a) ore, whereby to produce a lithium alumino silicate composition in which the weight ratio of the $Li_2O$ to $Fe_2O_3$ is at least about 50 to 1.

10. The lithium alumino silicate composition of claim 9 in which the weight ratio, in said finished lithium alumino silicate composition, of the $Li_2O$ to $Na_2O$ is at least about 13.

11. The lithium alumino silicate composition of claim 9 in which the eight ratio, in said finished lithium alumino silicate composition, of the $Li_2O$ to $K_2O$ is at least about 20.

12. The lithium alumino silicate composition of claim 9 in whidh the weight ratio, in said finished lithium alumino silicate composition of the $Li_2O$ to $Na_2O$ and $K_2O$ is at least about 13 $Li_2O$ to 1 $Na_2O$ and at least about 20 $Li_2O$ to 1 $K_2$.

* * * * *